United States Patent
Halford et al.

(10) Patent No.: US 6,739,622 B2
(45) Date of Patent: May 25, 2004

(54) METHOD OF FOLDING AIR BAG

(75) Inventors: Rick L. Halford, Gilbert, AZ (US); Paul E. Chizenko, Mesa, AZ (US); Jeffrey A. Jenkins, Shelby Township, MI (US); Kurt F. Fischer, Oxford, MI (US)

(73) Assignees: TRW Vehicle Safety Systems Inc., Lyndhurst, OH (US); TRW Inc., Lyndhurst, OH (US)

( * ) Notice: Subject to any disclaimer, the term of this patent is extended or adjusted under 35 U.S.C. 154(b) by 35 days.

(21) Appl. No.: 10/085,214

(22) Filed: Feb. 28, 2002

(65) Prior Publication Data

US 2002/0149186 A1 Oct. 17, 2002

Related U.S. Application Data

(63) Continuation-in-part of application No. 09/822,132, filed on Mar. 30, 2001, now abandoned.

(51) Int. Cl.$^7$ .............................................. B60R 21/16
(52) U.S. Cl. ................... 280/743.1; 493/405; 53/429
(58) Field of Search ............................ 280/743.1, 732, 280/728.1; 493/405, 243, 940; 53/429, 116, 117

(56) References Cited

U.S. PATENT DOCUMENTS

| | | |
|---|---|---|
| 5,140,799 A | 8/1992 | Satoh |
| 5,178,407 A * | 1/1993 | Kelley ..................... 280/728.1 |
| 5,240,282 A | 8/1993 | Wehner et al. |
| 5,275,435 A | 1/1994 | Fischer |
| 5,492,367 A | 2/1996 | Albright et al. |
| 5,531,477 A | 7/1996 | Madrigal et al. |
| 5,538,281 A | 7/1996 | Patercsak |
| 5,542,698 A | 8/1996 | Ichino et al. |
| 5,605,350 A * | 2/1997 | Bates et al. .............. 280/743.1 |
| 6,092,839 A | 7/2000 | Nagano |
| 6,170,857 B1 * | 1/2001 | Okada et al. ............ 280/743.1 |
| 6,186,544 B1 | 2/2001 | Igawa |

FOREIGN PATENT DOCUMENTS

| | | | |
|---|---|---|---|
| JP | 406255437 | 9/1994 | |
| JP | 407009929 | 1/1995 | |
| JP | 10157541 A * | 6/1998 | ........... B60R/21/16 |

* cited by examiner

*Primary Examiner*—Peter C. English
(74) *Attorney, Agent, or Firm*—Tarolli, Sundheim, Covell & Tummino L.L.P.

(57) ABSTRACT

A method of folding an air bag (10) includes locating the air bag in a first configuration with front and back parts (140, 142) overlying each other and with a side part (70) folded and extending outwardly from the front and back parts. First and second portions (150, 152) of the air bag (10) are on opposite sides of a top to bottom centerline (154). A retainer (114) is located adjacent the top edge (144) of the configuration. The air bag (10) is folded from bottom to top to a second configuration in which it overlies and has a height corresponding to the height of the retainer (114). The first and second portions (150, 152) of the air bag (10) have portions (151, 153) that project laterally beyond the sides (124, 126) of the retainer (114). The laterally projecting portions (151, 153) are moved laterally inward to overlie the retainer (114), and the air bag (10) has a width corresponding to the width of the retainer. The first portion (150) of the air bag (10) as thus folded is a mirror image, about the centerline (154), of the second portion (152).

25 Claims, 7 Drawing Sheets

METHOD OF FOLDING AIR BAG

RELATED APPLICATIONS

This application is a continuation-in-part of, and claims the benefit of the filing date of, U.S. patent application Ser. No. 09/822,132, filed Mar. 30, 2001, abandoned.

BACKGROUND OF THE INVENTION

1. Technical Field

The present invention relates to an inflatable vehicle occupant protection device, such as an air bag, and to a method of folding an air bag.

2. Description of the Prior Art

U.S. Pat. No. 5,275,435 shows a folded air bag. As the air bag inflates, a first folded portion pivots and moves sideways to contact the vehicle occupant. The first folded portion directs the vehicle occupant off to one side of the inflating air bag, and the remainder of the air bag inflates to the side of the vehicle occupant.

U.S. Pat. No. 6,092,839 shows a method of folding an air bag in which the air bag is first folded in a bottom to top direction and then in a side to side direction.

SUMMARY OF THE INVENTION

In accordance with one embodiment of the invention, the present invention is a method of folding an air bag having a front part for facing an occupant of a vehicle when the air bag is inflated, a back part for facing away from the occupant when the air bag is inflated, a side part connected to the front and back parts and extending between the front and back parts when the air bag is inflated, and a throat connected to the side part and for directing inflation fluid into the air bag. The throat is connected to a generally rectangular air bag retainer.

The method includes the step of arranging the air bag in a first configuration with the front and back parts overlying each other and with the side part folded and extending outwardly from the front and back parts. The air bag when in the first configuration has a top edge, a bottom edge, and first and second portions on opposite sides of a top to bottom centerline of the configuration. The retainer is located adjacent the top edge of the configuration. When the air bag is in the first configuration, each of the air bag and the retainer has a height measured in a direction along the centerline and a width measured in a direction perpendicular to the centerline.

The method also includes the step of manipulating the air bag from the bottom edge to the top edge from the first configuration to a second configuration in which the air bag overlies the retainer and has a height corresponding to the height of the retainer. When the air bag is in the second configuration, the first and second portions of the air bag have portions that project laterally beyond respective opposite sides of the retainer.

The method further includes the step of manipulating the air bag from the second configuration to a third configuration in which the laterally projecting portions of the air bag are moved laterally inward to overlie the retainer and the air bag has a width corresponding to the width of the retainer. When the air bag is in the third configuration, the first portion of the air bag is folded as a mirror image, about the centerline, of the second portion of the air bag.

In accordance with another embodiment of the invention, the present invention is a method of folding an air bag having a front part for facing an occupant of a vehicle when the air bag is inflated, a back part for facing away from the occupant when the air bag is inflated, and a side part connected to the front and back parts and extending between the front and back parts when the air bag is inflated. The air bag is connected to an air bag retainer.

The method includes the steps of arranging the air bag in a first configuration with the front and back parts overlying each other and with the side part folded and extending outwardly from the front and back parts. The air bag when in the first configuration has a top edge, a bottom edge, and first and second portions on opposite sides of a top to bottom centerline of the first configuration. Each of the air bag and the retainer has a height measured in a direction along the centerline and a width measured in a direction perpendicular to the centerline.

The method also includes the step of manipulating the air bag from the first configuration to a second configuration in which the air bag overlies the retainer and has a height corresponding to the height of the retainer. When the air bag is in the second configuration, the first and second portions of the air bag has portions that project laterally beyond respective opposite sides of the retainer, with the side part of the air bag still being folded and extending outwardly from the front and back parts.

The method further includes the step of manipulating the air bag from the second configuration to a third configuration in which the laterally projecting portions of the air bag are moved laterally inward to overlie the retainer and the air bag has a width corresponding to the width of the retainer. The step of manipulating the air bag to the third configuration includes folding the first and second portions of the air bag about the centerline.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION OF THE INVENTION

Figure 1:
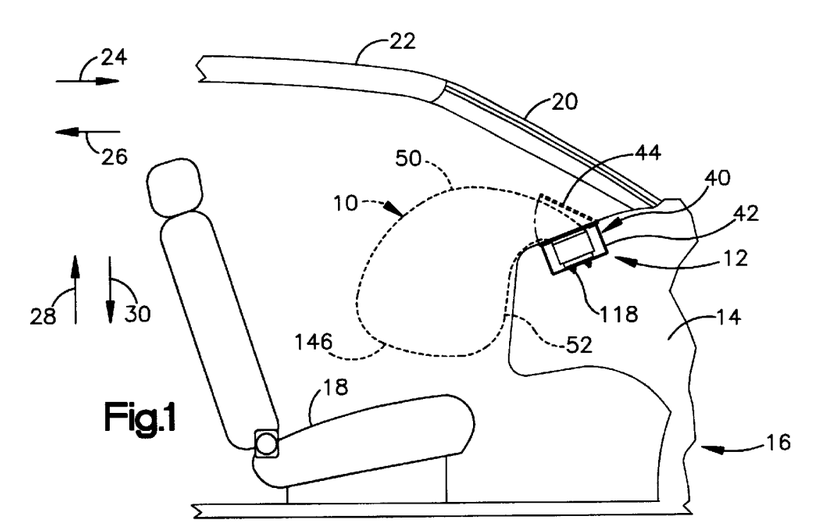
FIG. 1 is a schematic side view of a portion of a vehicle including an air bag in accordance with the present invention, shown in phantom in an inflated condition.

The present invention relates to an inflatable vehicle occupant protection device, such as an air bag. As representative of the invention, FIG. 1 illustrates an air bag 10. The air bag 10 forms part of an air bag module 12 mounted in the instrument panel 14 of a vehicle 16.

The air bag module 12 also includes an inflator (not shown) that contains an inflation fluid source for inflating the air bag 10. The inflation fluid source may be a stored quantity of pressurized inflation fluid and an ignitable material for heating the inflation fluid. The inflation fluid source alternatively could use the combustion of gas-generating material to generate inflation fluid in the form of gas to inflate the air bag 10, or could be a stored quantity of pressurized inflation fluid for inflating the air bag.

The vehicle 16 includes a front passenger seat 18 for an occupant of the vehicle. The vehicle windshield 20 extends upward and rearward from the instrument panel 14, and merges with the vehicle roof 22. In the vehicle 16, a forward direction is illustrated by the arrow 24, and a rearward direction by the arrow 26. An upward direction in the vehicle 16 is illustrated by the arrow 28, and a downward direction in the vehicle is illustrated by the arrow 30.

The air bag module 12 is mounted in an upward facing location in the instrument panel 14, and is thus a "top-mount" type of module. The air bag module 12 includes a container 40 secured in the instrument panel 14 in a manner not shown. The container 40 includes a main body portion 42 and a door 44. The door 44 is hinged to the main body portion 42 of the container 40 at the top of the container. It should be understood that the container 40 may have a different configuration from the one shown, or may be a portion of the instrument panel 14 itself.

The air bag 10 (FIGS. 2–4) includes a contact face or front panel 50 (FIG. 4) that is closest to the vehicle occupant when the air bag is inflated, and a back panel 52 that is farthest from the vehicle occupant when the air bag is inflated. The front panel 50 and the back panel 52, as shown, are similar or identical in size and shape to each other.

The front panel 50 (FIG. 4) is, preferably, a single piece of material. The front panel 50 may, alternatively, be constructed of a plurality of pieces of fabric material that are sewn together to form the front panel. The front panel has a generally rectangular configuration, with rounded corners. The front panel 50 has a top edge 54, a bottom edge 56, and inboard and outboard side edges 58 and 60.

Figures 2, 4:
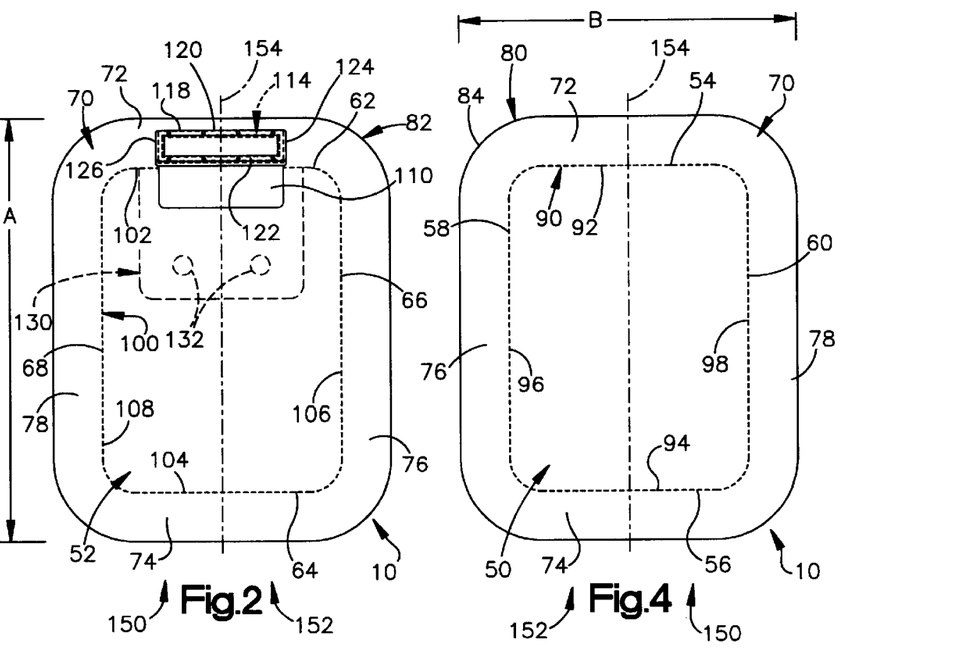
FIG. 2 is an enlarged back view of the air bag of FIG. 1 shown in a first configuration laid flat for folding.
FIG. 4 is a front view similar to FIG. 2 of the air bag of FIG. 1.

The back panel 52 is, preferably, a single piece of material. The back panel 52 may, alternatively, be constructed of a plurality of pieces of fabric material that are sewn together to form the back panel. The back panel 52 has a generally rectangular configuration, with rounded corners. The back panel 52 has a top edge 62, a bottom edge 64, and inboard and outboard side edges 66 and 68.

The air bag further includes a side panel 70, which connects the front panel 50 and the back panel 52. The side panel 70 is preferably made from a plurality of pieces of fabric materials that are sewn together to form the side panel. The side panel 70 extends between the front panel 50 and the back panel 52 when the air bag 10 is inflated. Because of the presence of the side panel 70, the front and back panels 50 and 52 move apart from each other and the air bag 10 has a substantial depth when inflated.

The side panel 70 has the general configuration of an open rectangle when the air bag 10 is viewed as in FIGS. 2 and 4, extending completely around the front panel 50 and the back panel 52. This rectangular configuration includes a top side portion 72, a bottom side portion 74, an inboard side portion 76 and an outboard side portion 78.

The side panel 70 has parts on both the front and the back of the air bag 10 when the air bag is laid flat as seen in FIGS. 2 and 4. Specifically, the side panel 70 has a front part 80 that is located on the front of the air bag 10, and a back part 82 that is located on the back of the air bag. The side panel 70 is folded at a fold line 84 between the front and back parts 80 and 82 when the air bag 10 is laid flat as shown in FIGS. 2 and 4. The fold line 84 forms the outer edge of the air bag 10 when the air bag is in the configuration shown in FIGS. 2–4.

The side panel 70 is sewn to the front panel 50 (FIG. 4) with a front seam 90. The front seam 90 extends completely around the front panel 50. The front seam 90 includes a top seam portion 92 that joins the top edge 54 of the front panel 50 to the top side portion 72 of the side panel 70. The front seam 90 includes a bottom seam portion 94 that joins the bottom edge 56 of the front panel 50 to the bottom side portion 74 of the side panel 70. An inboard seam portion 96 joins the inboard edge 58 of the front panel 50 to the inboard side portion 76 of the side panel 70. An outboard seam portion 98 joins the outboard edge 60 of the front panel 50 to the outboard side portion 78 of the side panel 70.

The side panel 70 is sewn to the back panel 52 (FIG. 2) with a back seam 100. The back seam 100 extends completely around the back panel 52. The back seam 100 includes a top seam portion 102 that joins the top edge 62 of the back panel 52 to the top side portion 72 of the side panel 70. The back seam 100 includes a bottom seam portion 104 that joins the bottom edge 64 of the back panel 52 to the bottom side portion 74 of the side panel 70. An inboard seam portion 106 joins the inboard edge 66 of the back panel 52 to the inboard side portion 76 of the side panel 70. An outboard seam portion 108 joins the outboard edge 68 of the back panel 52 to the outboard side portion 78 of the side panel 70.

The air bag 10 includes a throat 110 (FIG. 3) for directing inflation fluid into the air bag. The throat 110 is sewn to and extends outward from the back panel 52. A retaining ring, or retainer 114, is connected with the end of the throat 110 opposite the back panel 52. The retainer 114 is a rigid member, preferably made from metal, that has fastening means 116 for securing the air bag 10 to the vehicle instrument panel. In the illustrated embodiment, the fastening means 116 includes eight threaded studs that project from a main body portion 118 of the retainer 114. The main body portion 118 of the retainer 114 has a generally rectangular configuration including top and bottom portions 120 and 122 and inboard and outboard side portions 124 and 126.

Figure 5:
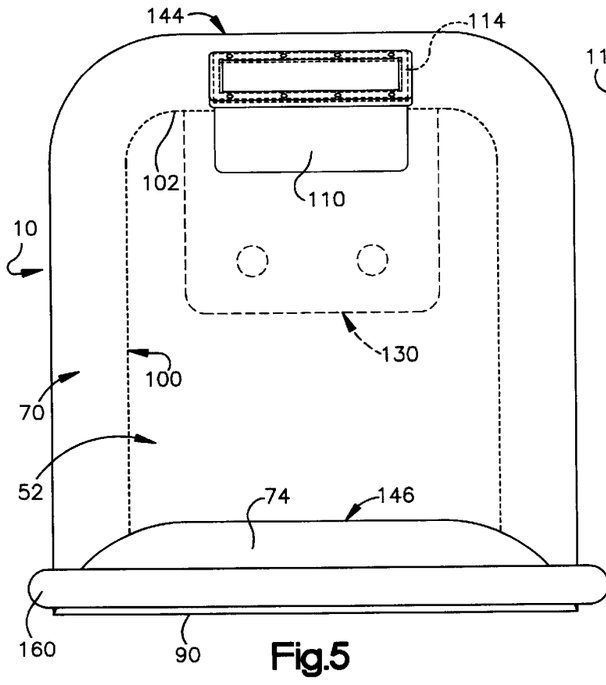
FIG. 5 is a view similar to FIG. 2 showing the air bag in a condition after being folded from the first configuration shown in FIG. 2.
Figure 7:
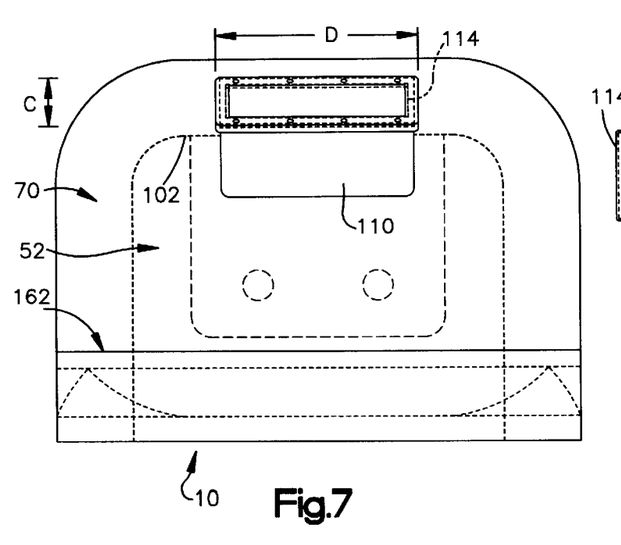
FIG. 7 is a view similar to FIG. 5 showing the air bag in a condition after being folded further from the condition shown in FIG. 5.

The air bag 10 includes an inner bag 130, shown only in FIGS. 2, 5 and 7. The inner bag 130 is in fluid communication with the throat 110. The inner bag 130 has one or more vents 132 for directing fluid from the inner bag 130 into the other parts of the air bag 10, in a known manner.

Figure 3:
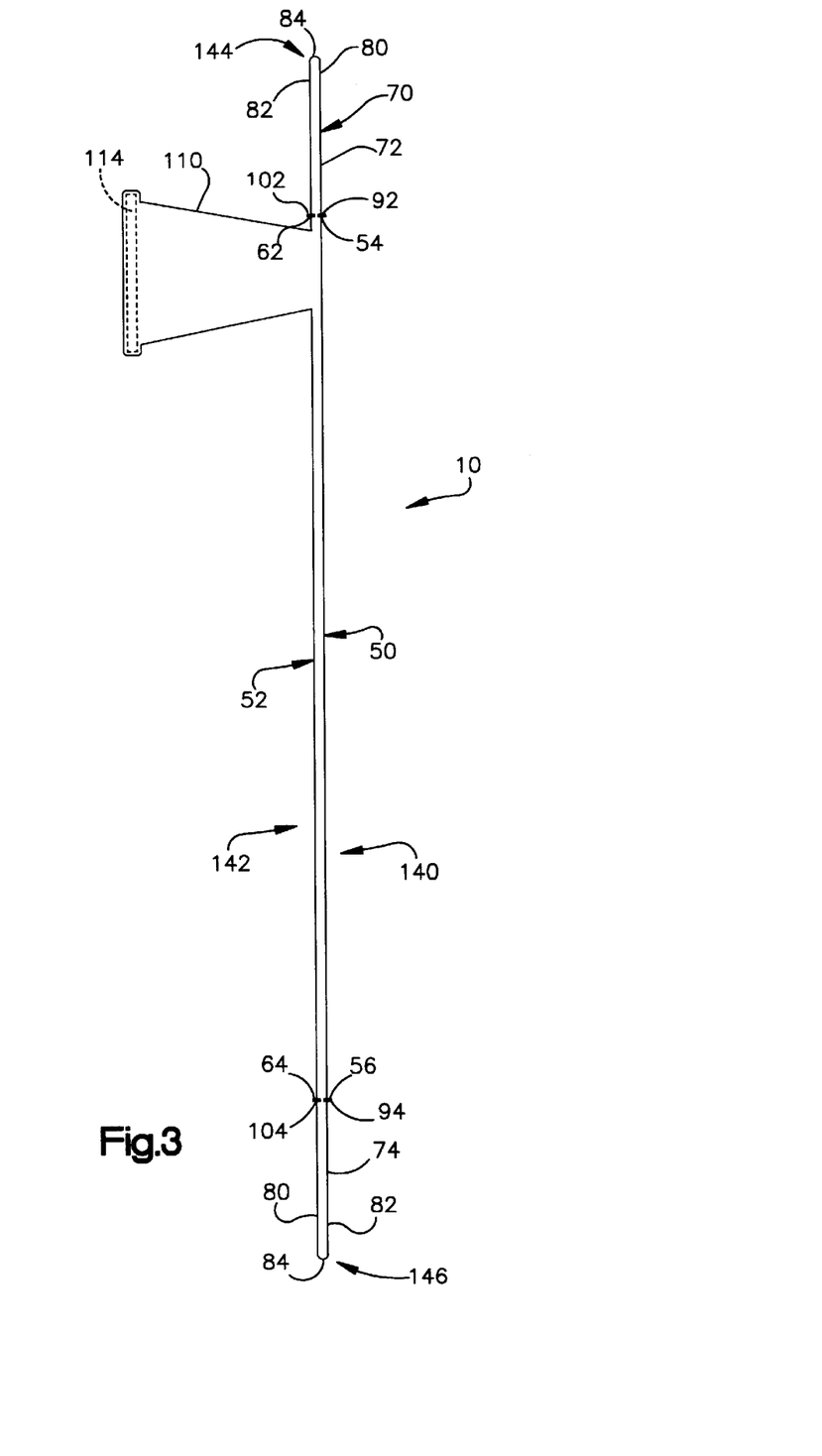
FIG. 3 is a schematic sectional view of the air bag of FIG. 2, taken along line 3—3 of FIG. 2.

In the process of manipulating the material of the air bag 10 into a condition in which the air bag is storable in the instrument panel 14 (FIG. 1), the air bag is placed in a first configuration as seen in FIGS. 2–4. In the first configuration, the air bag 10 is laid substantially flat. The front panel 50 of the air bag is underneath the back panel 52. The side panel 70 extends outwardly from the front and back panels 50 and 52.

When the air bag 10 is in this first configuration, the air bag has a front part 140 and a back part 142 that overlie each other. The front part 140 comprises the front panel 50 and the front part 80 of the side panel 70. The back part 142 comprises the back panel 52 and the back part 82 of the side panel 70.

The air bag 10 when in the first configuration has a top edge 144, which comprises the fold line 84 in the top side portion 72 of the side panel 70. The retainer 14 is adjacent the top edge 144 of the configuration. The air bag 10 when in the first configuration has a bottom edge 146, which comprises the fold line 84 in the bottom side portion 74 of the side panel 70.

The air bag 10 when in the first configuration has a first portion 150 that is located on the outboard side (to the left as viewed in FIG. 2 and to the right as viewed in FIG. 4) of a top to bottom centerline 154 of the air bag 10. The air bag when in the first configuration has a second portion 152 that is located on the inboard side (to the right as viewed in FIG. 2 and to the left as viewed in FIG. 4) of the top to bottom centerline 154.

The air bag 10 has a height "A" (FIG. 2) measured in a direction along the top to bottom centerline 154 of the air bag. The air bag 10 has a width "B" (FIG. 4) measured in a direction perpendicular to the centerline 154. The height "A" of the air bag 10 is substantially greater than the width "B" of the air bag, in the illustrated embodiment.

The retainer 114 has a height "C" (FIG. 7) measured in a direction along the top to bottom centerline 154 of the air bag. The retainer 114 has a width "D" (FIG. 7) measured in a direction perpendicular to the centerline 154. The height "C" of the retainer 114 is substantially less than the width "D" of the retainer, in the illustrated embodiment.

Figure 13:
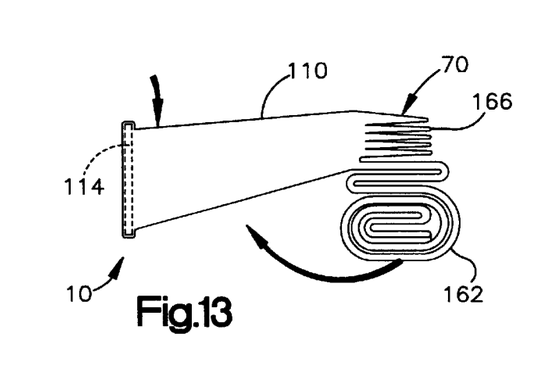
Figure 14:
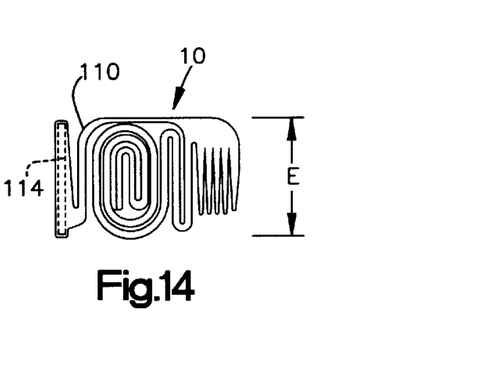

After the air bag 10 is placed in the first configuration shown in FIGS. 2–4, the air bag is manipulated, in a series of folding and rolling steps, from the first configuration to a second configuration as shown in FIG. 14. These steps include rolling the air bag 10 up from bottom to top, in a manner described below in detail with reference to FIGS. 5–14. After the air bag 10 is manipulated into the second configuration shown in FIG. 14, the air bag is manipulated, in a series of folding steps, from the second configuration to a third configuration shown in FIG. 16. These steps include folding the air bag 10 side to side, in a manner described below in detail with reference to FIGS. 15 and 16.

To start the bottom to top rolling process, the air bag 10 (FIGS. 5 and 6) is "flat rolled" along the bottom portions 94 and 104 of the front and back seams 90 and 100, respectively. This moves the bottom side portion 74 of the side panel 70 into a position overlying the back panel 52, as shown in FIGS. 5 and 6.

Figure 6:
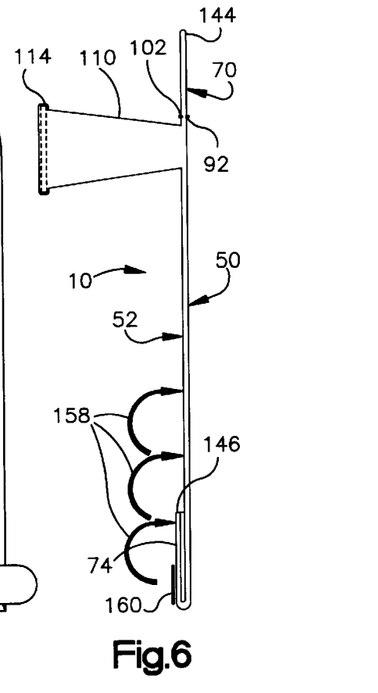
FIG. 6 is a schematic sectional view of the air bag of FIG. 5, taken along line 6—6 of FIG. 5.
Figure 8:
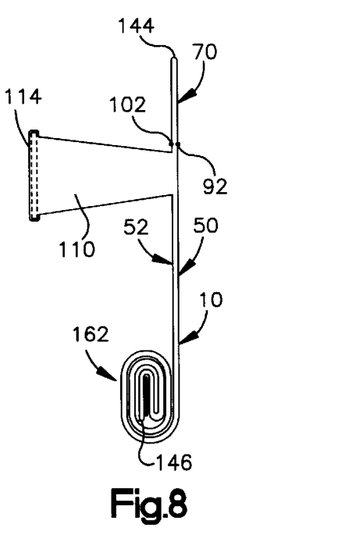
FIG. 8 is a schematic sectional view of the air bag of FIG. 7, taken along line 8—8 of FIG. 7.

Next, the air bag 10 is flat rolled three to four times in a bottom to top direction, as shown by the arrows 158 in FIGS. 6–8. This rolling may be performed with the aid of a paddle 160 to help provide rolled sections that are all of the same, specific height. The rolled sections that result have a smaller height than the first rolled section shown in FIGS. 5 and 6. The air bag 10 is rolled up in this manner only until the bottom edge of the inner bag 130 is reached. The roll 162 that results may be clamped with clamps (not shown), and the paddle 160 removed.

Figure 9:
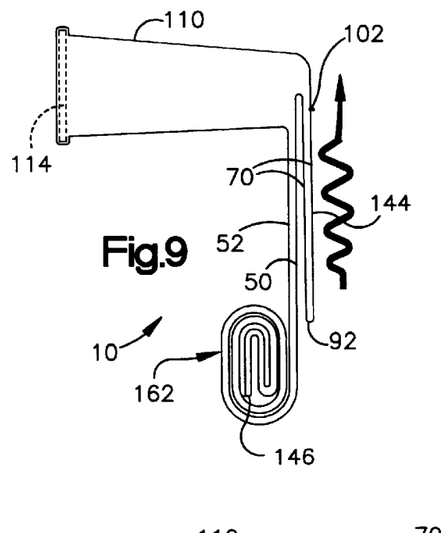
FIGS. 9–14 are a series of views similar to FIG. 8 showing subsequent steps in the folding of the air bag into a second configuration.

Then, the top side portion 72 of the side panel 70 is grasped and repositioned, moving the air bag 10 from the condition shown in FIG. 8 to the condition shown in FIG. 9. As a result, the top seam portion 92 of the front seam 90, which joins the top edge 54 of the front panel 50 to the top side portion 72 of the side panel 70, is adjacent the roll 162. The top seam portion 102 of the back seam 100, which joins the top edge 62 of the back panel 52 to the top side portion 72 of the side panel 70, is located adjacent the throat 110. The side panel 70 and the front panel 50 overlie one another.

Figure 10:
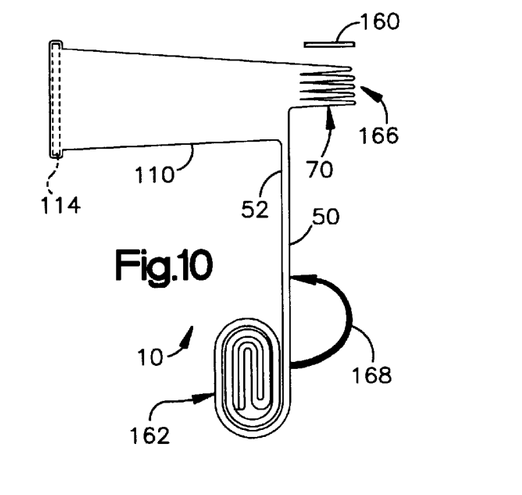

The paddle 160 is then positioned relative to the air bag 10 as shown in FIG. 10, standing upright along its long edge. The top side portion 72 of the side panel 70 is accordion folded in a manner shown in FIGS. 9 and 10. Four to five accordion folds are made, and are placed adjacent the paddle 160. The paddle 160 helps to set the height of the folds and insure uniformity of the folds. The resulting stack 166 of folded portions of the top side portion 72 of the side panel 70 may be held together with one or more clamps (not shown). It should be understood that the illustration of the stack 166 in FIG. 10 is only schematic, and that a larger or smaller number of folded portions may be provided.

Figure 11:
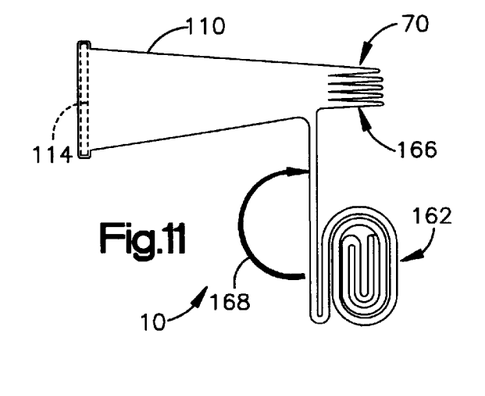
Figure 12:
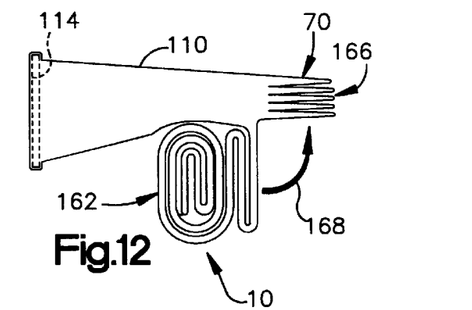

The roll 162 is then "flip folded" three to four times, as shown by the arrows 168 so that it lies first against the front panel 50 and then against the back panel 52, until it is adjacent the stack of folds 166, as shown in FIGS. 10–12. The air bag 10 is then rotated 90 degrees and tucked against the throat 110, as shown in FIGS. 13 and 14, so that the air bag has a height "F" (as measured in a direction along the centerline 154) corresponding to the height "C" of the retainer 114.

Figure 15:
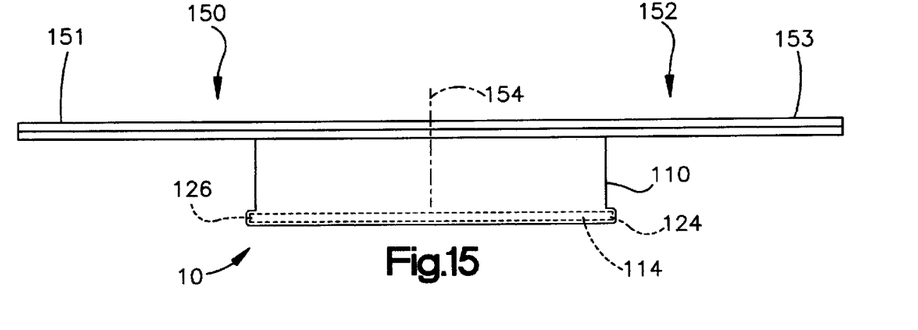
FIGS. 15 and 16 are views illustrating subsequent side to side folding of the air bag into a third configuration.
Figure 16:
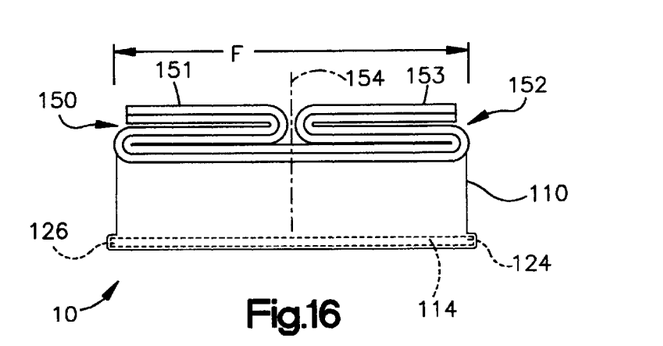

The air bag 10 is then folded inward from the fold lines 84 in the inboard and outboard side portions 76 and 78 toward the centerline 154 (FIGS. 15 and 16). The inward folding gives the air bag a width "F" (as measured in a direction perpendicular to the centerline 154) corresponding to the width "D" of the retainer 114. When the air bag 10 is in the condition shown in FIG. 15, it has portions 151 and 153 that project laterally beyond the sides 126 and 124, respectively, of the retainer 114. The portions 151 and 153 include the inboard and outboard side portions 78 and 76, respectively.

The first portion 150 of the air bag 10 (to the left of the centerline 154 as viewed in FIGS. 15 and 16) is then folded laterally inward in a Z-fold configuration so that the projecting portion 151 does not extend past the side 126 of the retainer 114. Then, the second portion 152 of the air bag 10 (to the right of the centerline 154 as viewed in FIGS. 15 and 16) is folded laterally inward in a Z-fold configuration so that the projecting portion 153 does not extend past the side 124 of the retainer 114. The second portion 152 of the air bag 10 is folded as a mirror image of the first portion 150. As viewed in FIG. 16, the first and second projecting portions 151, 153 are folded to form a stack of folds adjacent the retainer 114 with the side part of the air bag 10 being on top of the stack. The stack has a width corresponding to the final folded condition of the air bag 10. The folded air bag 10 is then in a condition to be mounted in the vehicle 16.

When the air bag 10 is inflated, substantially all portions of the air bag begin to inflate. The Z-folds of the first and second portions 150 and 152 of the air bag, which are folded side to side in the final folding steps of the process, are the first to inflate fully. As the first and second portions 150 and 152 inflate, the laterally folded portions 153 and 151, including the inboard and outboard side portions 76 and 78, move laterally outward, away from the retainer 114. This lateral movement occurs prior to any substantial unrolling or unfolding of the air bag 10 in the top to bottom direction (along the centerline 154). Because the first and second portions 150 and 152 of the air bag 10 are folded as mirror images of each other, the inboard and outboard side portions 76 and 78 inflate and unfold equally rapidly. This promotes rapid inflation of the portions 150 and 152, and can help to protect an occupant who is located to one side or the other of the inflating air bag 10.

As a result, if the occupant of the seat 18 is relatively close to the instrument panel 14 when the air bag 10 begins to inflate, the occupant is first contacted by laterally moving portions of the air bag 10. The air bag portions moving laterally tend to push the occupant at least partially laterally, rather than completely rearward, in the vehicle 16. This can help to minimize force transmitted to the vehicle occupant by the inflating air bag 10.

Eventually, as the air bag 10 inflates more completely, the roll 162 unrolls and inflates outward and downward, away from the windshield 20. Because of the direction in which the material of the roll 162 is rolled, it unrolls away from the occupant of the seat 18. Specifically, the rolled layers of the air bag 10 are rolled up during the folding process along the back panel 52 of the air bag, opposite the front panel or contact face 50 of the air bag. During inflation of the air bag 10, the front panel 50 of the air bag 10 is presented toward the occupant. The front panel 50 of the air bag 10 contacts the head and face of the occupant, and the back panel 52 of the air bag does not.

Therefore, inflation of the air bag 10 causes the roll 162 to unroll from a side of the air bag 10 opposite the occupant of the seat 18. The roll 162 unrolls in a clockwise direction (as viewed in FIG. 1) and in a direction away from the occupant of the seat 18, that is, in the forward direction 24 in the vehicle 16. As a result, a relatively flat portion of the front panel 50 moves into contact with the head of the occupant, and remains there as the roll 162 continues to unroll.

FIGS. 17–22 illustrate schematically a process of folding an air bag in accordance with a second embodiment of the invention. The folding process shown in FIGS. 17–22 is similar to the folding process shown in FIGS. 1–16. The folding process shown in FIGS. 17–22, like the folding process shown in FIGS. 1–16, is applicable to air bags of configurations different from that shown in the drawings.

The air bag 10a shown in FIGS. 17–22 is shown schematically only, and may be similar to the air bag 10 (FIGS. 1–16), but is not necessarily identical. For example, the air bag 10a as illustrated does not have a throat, or chute, between the retainer and the body portion of the air bag.

Figure 17:
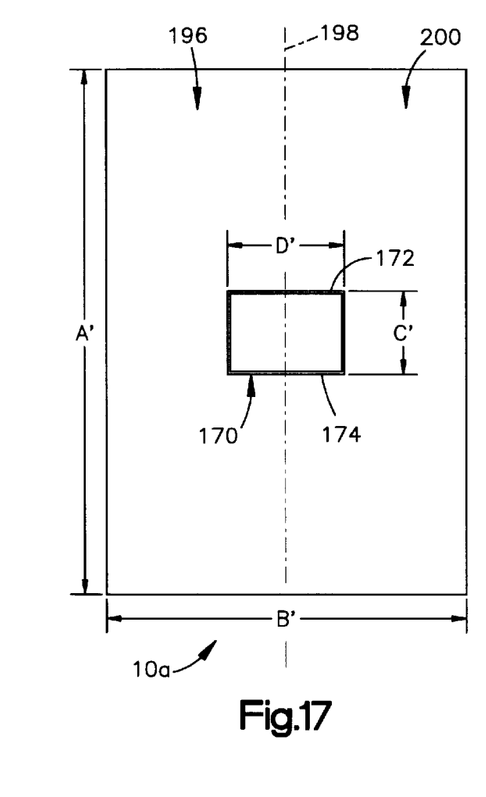
FIG. 17 is a schematic illustration of an air bag shown in a first configuration laid flat for folding.

The air bag 10a includes a retainer 170 that is similar to, and may be the same as, the retainer 114 (FIGS. 1–16). The retainer 170 has top and bottom edges 172 and 174. The retainer 170 has a front face 176 that is closest to the vehicle occupant when the air bag 10a is inflated, and a back face 178 that is farthest from the vehicle occupant when the air bag is inflated. During inflation of the air bag 10a, inflation fluid flows through the retainer 170 in a direction from the back face 178 to the front face 176.

Figures 18, 19:
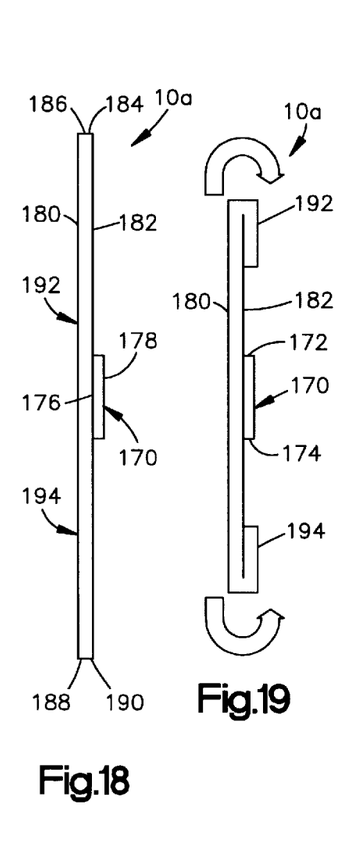
FIGS. 18–22 are a series of schematic views showing steps in the folding of the air bag of FIG. 17 into a second configuration.

In the process of manipulating the material of the air bag 10a into a condition in which the air bag is storable in the instrument panel 14 (FIG. 1), the air bag is placed in a first configuration as seen in FIGS. 17 and 18. In the first configuration, the air bag 10a is laid substantially flat. When the air bag 10a is in this first configuration, the air bag has a front part 180 and a back part 182 that overlie each other.

The air bag 10 when in the first configuration has a top edge 184, which comprises a fold line 186. The air bag 10a when in the first configuration has a bottom edge 188, which comprises a fold line 190. The retainer 170 is located about in the middle (top to bottom) of the configuration of the air bag 10a. A top portion 192 of the air bag 10a extends upward from the retainer 170, and a bottom portion 194 extends downward from the retainer.

The air bag 10a when in the first configuration has a first portion 196 (FIG. 17) that is located on the outboard side (to the left as viewed in FIG. 17) of a top to bottom centerline 198 of the air bag. The air bag 10a when in the first configuration has a second portion 200 that is located on the inboard side (to the right as viewed in FIG. 17) of the top to bottom centerline 198. Most of the material of the first and second portions 196 and 200 is located laterally outward of the retainer 170.

The air bag 10a has a height "A'" (FIG. 17) measured in a direction along the top to bottom centerline 198 of the air bag. The air bag 10a has a width "B'" (FIG. 17) measured in a direction perpendicular to the centerline 198. The height "A'" of the air bag 10a is substantially greater than the width "B'" of the air bag, in the illustrated embodiment.

The retainer 170 has a height "C'" (FIG. 17) measured in a direction along the top to bottom centerline 198 of the air bag 10a. The retainer 170 has a width "D'" (FIG. 17) measured in a direction perpendicular to the centerline 198. The height "C'" of the retainer 170 is substantially less than the width "D'" of the retainer, in the illustrated embodiment.

Figures 21, 22:
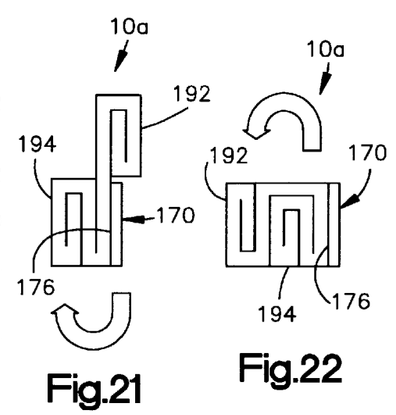

After the air bag 10a is placed in the first configuration shown in FIGS. 17 and 18, the air bag is manipulated, in a series of folding and/or rolling steps, from the first configuration to a second configuration as shown in FIG. 22.

Figure 20:
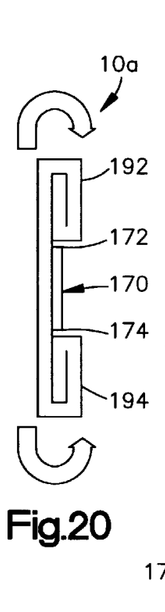

To start this process, the top portion 192 of the air bag 10 is "flat rolled" downward onto the back part 182, into a position adjacent the top edge 172 of the retainer 170, as shown schematically in FIGS. 19 and 20. Similarly, the bottom portion 194 of the air bag 10a is "flat rolled" upward onto the back part 182, into a position adjacent the bottom edge 174 of the retainer 170, as shown in FIGS. 19 and 20. While these steps are occurring, the first and second portions 196 and 200 of the air bag 10a remain laterally outward of the retainer 170. It should be understood that the top and bottom portions 192 and 194 could be moved into their respective positions adjacent the retainer 170 by folding or rolling steps that are different from those shown in FIGS. 19 and 20.

Next, the bottom portion 194 (FIG. 21) of the air bag 10a is flip folded so that it lies adjacent the front face 176 of the retainer 170. Then, the top portion 192 (FIG. 22) of the air bag 10a is flip folded so that it overlies the bottom portion 194 of the air bag, thus overlying also the front face 176 of the retainer 170. The top portion 192 of the air bag 10 is outermost in the stack of folded air bag portions.

The folded air bag 10a has a height (as measured in a direction along the centerline 198) corresponding to the height "C'" of the retainer 170. At this point in the folding process, the first and second portions 196 and 200 of the air bag 10a are still located laterally outward of the retainer 170.

The first and second portions 196 and 200 of the air bag 10a are then folded laterally inward toward the centerline 198, in a manner as shown in FIGS. 15 and 16 with respect to the air bag 10. This folding step gives the air bag a width (not shown) as measured in a direction perpendicular to the centerline 198 corresponding to the width "D'" of the retainer 170. The second portion 200 of the air bag 10*a* is folded as a mirror image of the first portion 196. The folded air bag 10*a* is then in a condition to be mounted in the vehicle 16.

When the air bag 10*a* is inflated, it inflates in a manner substantially similar to that of the air bag 10 (FIGS. 1–16). The first and second portions 196 and 200 inflate and move laterally outward, away from the retainer 170. This lateral movement occurs prior to any substantial unrolling or unfolding of the air bag 10*a* in the top to bottom direction (along the centerline 198). Because the first and second portions 196 and 200 of the air bag 10*a* are folded as mirror images of each other, the first and second portions inflate and unfold equally rapidly. This promotes rapid inflation of the portions 196 and 200, and can help to protect an occupant who is located to one side or the other of the inflating air bag 10.

Eventually, as the air bag 10*a* inflates more completely, the top portion 192 of the air bag inflates upward, because it has been folded or rolled downward to the retainer 170. The bottom portion 194 of the air bag 10*a* inflates downward, because it has been folded or rolled upward to the retainer 170.

Figures 23, 24:
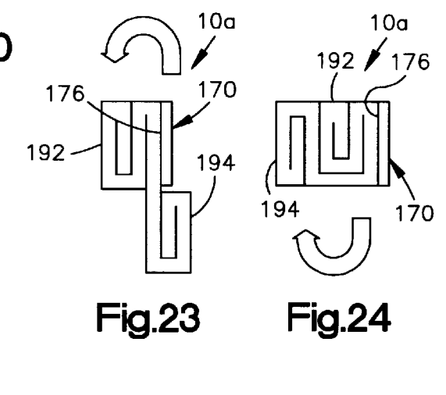
FIGS. 23 and 24 are schematic views illustrating alternative steps in the folding process of FIGS. 21 and 22.

FIGS. 23 and 24 illustrate schematically two folding steps that can be substituted for the folding steps shown in FIGS. 21 and 22. In the folding steps shown in FIGS. 23 and 24, the top portion 192 of the air bag 10*a* is folded first onto the front face 176 of the retainer 170, and the bottom portion 194 of the air bag is thereafter folded onto the top portion 192. This folding procedure can help to promote inflation of the bottom portion 194 of the air bag 10*a* prior to inflation of the top portion 192 of the air bag.

FIGS. 25–31 illustrate schematically several alternative methods, in accordance with the present invention, of folding the air bag 10*a*. The methods differ from each other with respect to where (in a top to bottom direction) the retainer is located at the beginning of the folding process, and also with respect to the direction of folding of one or more portions of the air bag. In each one of FIGS. 25–31, the air bag is shown in a first configuration like the first configuration shown in FIG. 18.

Figures 25, 26, 27, 28:
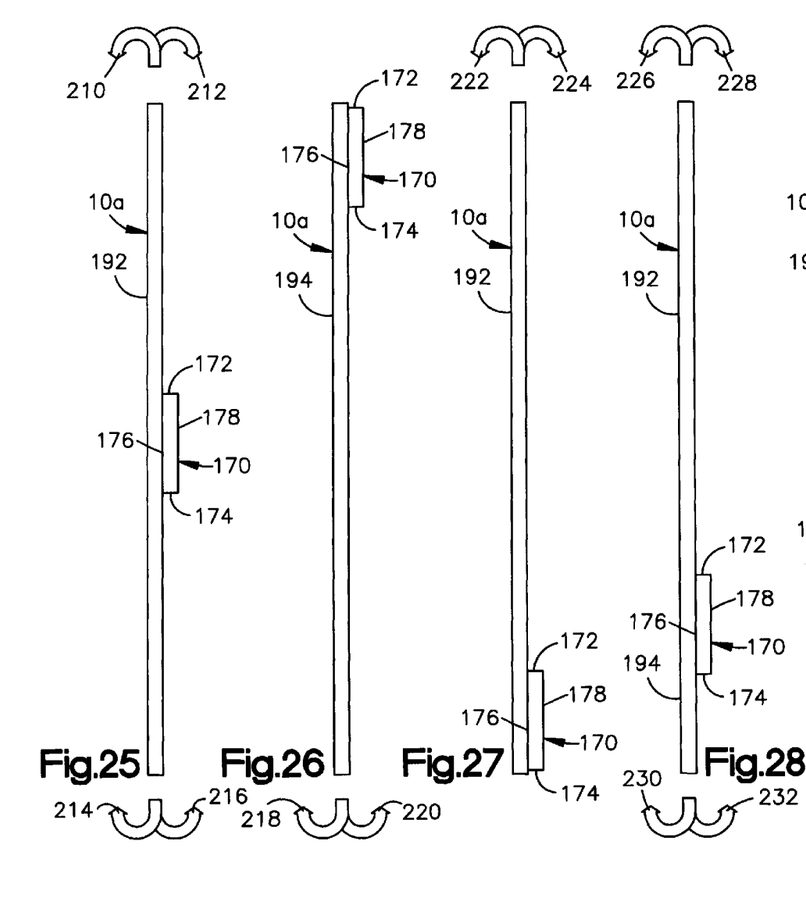
FIGS. 25–31 are schematic illustrations, similar to FIG. 18, of air bags shown in a first configuration laid flat for folding.

In FIG. 25, the air bag 10*a* is shown with its retainer 170 in the middle, as in FIGS. 17 and 18. As indicated by the arrow 210, the top portion 192 of the air bag 10*a* can be folded in a direction toward the front face 176 of the retainer 170. Alternatively, and as indicated by the arrow 212, the top portion 192 of the air bag 10*a* can be folded in the opposite direction, toward the back face 178 of the retainer 170, in the manner described above with reference to FIGS. 19 and 20. In either case, the top portion 192 of the air bag is folded to a position adjacent the top edge 172 of the retainer 170, for example, as shown in FIG. 20.

Similarly, as indicated by the arrow 214, the bottom portion 194 of the air bag 10*a* can be folded in a direction toward the front face 176 of the retainer 170. Alternatively, and as indicated by the arrow 216, the bottom portion 194 of the air bag 10*a* can be folded in the opposite direction, toward the back face 178 of the retainer 170, in the manner described above with reference to FIGS. 19 and 20. In either case, the bottom portion 194 of the air bag 10*a* is folded to a position adjacent the bottom edge 174 of the retainer 170, for example, as shown in FIG. 20.

To finish the top-to-bottom folding of the air bag 10*a*, the bottom portion 194 of the air bag 10*a* can be moved first into a position overlying the retainer 170, followed by the top portion 192, in the manner shown in FIGS. 21 and 22. Alternatively, the top portion 192 of the air bag 10*a* can be moved first into a position overlying the retainer 170, followed by the bottom portion 194, in the manner shown in FIGS. 23 and 24.

In FIG. 26, the air bag 10*a* is shown in a first configuration with its retainer 170 at the top, like the air bag 10 shown in FIGS. 1–16. Because the retainer 170 is at the top of the configuration, substantially all of the air bag 10*a* is a bottom portion 194 that is folded upward to the retainer. As indicated by the arrow 218, the bottom portion 194 of the air bag 10*a* can be folded in a direction toward the front face 176 of the retainer 170. Alternatively, and as indicated by the arrow 220, the bottom portion 194 of the air bag 10*a* can be folded in the opposite direction, toward the back face 178 of the retainer 170. In either case, the bottom portion 194 of the air bag 10*a* is folded to a position adjacent the bottom edge 174 of the retainer 170, as shown, for example, in FIG. 20.

In FIG. 27, the air bag 10*a* is shown in a first configuration with its retainer 170 at the bottom, the opposite of the configuration shown in FIG. 26. Because the retainer 170 is at the bottom of the configuration, substantially all of the air bag 10*a* is a top portion 192 that is folded downward to the retainer. As indicated by the arrow 222, the top portion 192 of the air bag 10*a* can be folded in a direction toward the front face 176 of the retainer 170. Alternatively, and as indicated by the arrow 224, the top portion 192 of the air bag 10*a* can be folded in the opposite direction, toward the back face 178 of the retainer 170. In either case, the top portion 192 of the air bag 10*a* is folded to a position adjacent the top edge 172 of the retainer 170, for example, as shown in FIG. 20.

In FIG. 28, the air bag 10*a* is shown in a first configuration with its retainer near but not at the bottom of the air bag. Because the retainer 170 is near the bottom of the configuration, most of the air bag 10*a* is a top portion 192 that is folded downward to the retainer. As indicated by the arrow 226, this top portion 192 can be folded in a direction toward the front face 176 of the retainer 170. Alternatively, and as indicated by the arrow 228, the top portion 192 of the air bag 10*a* can be folded in the opposite direction, toward the back face 178 of the retainer 170. In either case, the top portion 192 of the air bag 10*a* is folded to a position adjacent to the top edge 172 of the retainer 170.

In FIG. 28, a smaller part of the air bag 10*a* is a bottom portion 194 that is folded upward toward the retainer 170. As indicated by the arrow 230, this bottom portion 194 can be folded in a direction toward the front face 176 of the retainer 170. Alternatively, and as indicated by the arrow 232, the bottom portion 194 of the air bag 10*a* can be folded in the opposite direction, toward the back face 178 of the retainer 170. In either case, the bottom portion 194 is folded to a position adjacent the bottom edge 174 of the retainer 170.

To finish the top-to-bottom folding of the air bag 10*a* in FIG. 28, the bottom portion 194 of the air bag can be folded into a position overlying the retainer 170, followed by the top portion 192, in the manner shown in FIGS. 21 and 22. Alternatively, the top portion 192 of the air bag 10*a* can be folded into a first position overlying the retainer 170, followed by the bottom portion 194, in the manner shown in FIGS. 23 and 24.

Figures 29, 30, 31:
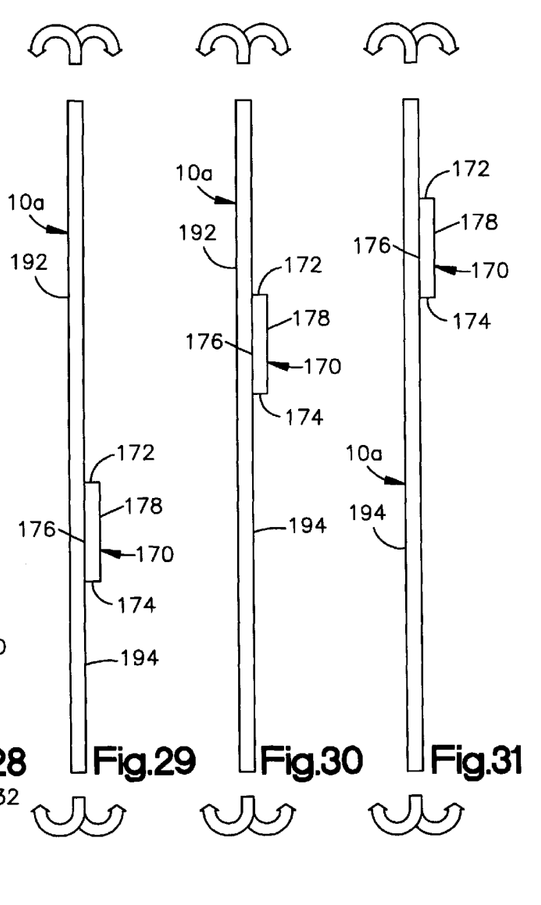

In FIG. 29, the air bag 10*a* is shown in a first configuration with its retainer 170 near but below the middle of the air bag.

The folding options that are available in this case are similar to those shown in FIG. 28.

In FIG. 30, the air bag 10a is shown in a first configuration with its retainer 170 above but not at the middle of the air bag. The folding options that are available in this case are like those shown in FIG. 29, with top and bottom reversed.

Similarly, in FIG. 31 the air bag 10a is shown in a first configuration with its retainer 170 near but below the top of the air bag. The folding options that are available in this case are like those shown in FIG. 28, with top and bottom reversed.

From the above description of the invention, those skilled in the art will perceive improvements, changes and modifications in the invention. For example, not all air bags are symmetrical side to side. As a result, the longer side might be folded either with bigger folds or with more folds than the shorter side. Thus, the side to side folding of an air bag in accordance with the present invention need not be done with the sides being folded as mirror images of each other. In addition, some air bags do not have retainers, but instead are secured directly to the inflator or to the housing. Thus, the folding of an bag in accordance with the present invention need not be to a condition overlying a retainer; the retainer is used herein only as illustrating the dimensions and location of the final folded condition of the air bag. Such improvements, changes and modifications within the skill of the art are intended to be covered by the appended claims.

Having described the invention, we claim:

1. A method of folding an air bag having a front part for facing an occupant of a vehicle when the air bag is inflated, a back part for facing away from the occupant when the air bag is inflated, a side part connected to the front and back parts and extending between the front and back parts when the air bag is inflated, and a throat for directing inflation fluid into the air bag, the throat being connected to a generally rectangular air bag retainer, said method including the steps of:

arranging the air bag in a first configuration with the front and back parts overlying each other and with the side part folded and extending outwardly from the front and back parts, the air bag when in the first configuration having a top edge, a bottom edge, and first and second portions on opposite sides of a top to bottom centerline of the configuration, the retainer being located adjacent the top edge of the configuration;

the air bag and the retainer each having a height measured in a direction along the centerline and a width measured in a direction perpendicular to the centerline;

manipulating the air bag from the bottom edge to the top edge from the first configuration to a second configuration in which the air bag overlies the retainer and has a height corresponding to the height of the retainer, the first and second portions of the air bag having portions that project laterally beyond respective opposite sides of the retainer;

manipulating the air bag from the second configuration to a third configuration in which the laterally projecting portions of the air bag are moved laterally inward to overlie the retainer and the air bag has a width corresponding to the width of the retainer;

when the air bag is in the third configuration, the first portion of the air bag being folded as a mirror image, about the centerline, of the second portion of the air bag.

2. A method as set forth in claim 1 wherein said step of manipulating the air bag from the bottom edge to the top edge from the first configuration to a second configuration comprises rolling up said bottom edge of said air bag toward said top edge of said air bag.

3. A method as set forth in claim 2 wherein said step of manipulating the air bag from the bottom edge to the top edge from the first configuration to a second configuration comprises the step of flip folding a part of the air bag in a bottom to top direction after rolling up said bottom edge of said air bag toward said top edge of said air bag.

4. A method as set forth in claim 2 wherein said step of manipulating the air bag from the second configuration to a third configuration comprises folding the first and second portions of the air bag laterally inward to overlie the retainer.

5. A method as set forth in claim 1 wherein said step of manipulating the air bag from the first configuration to the second configuration comprises moving said front and back parts of said air bag along said back part of said air bag, opposite said front part of said air bag, to form a roll that unrolls from a side of said air bag opposite from the vehicle occupant upon inflation of said air bag.

6. A method as set forth in claim 1 wherein each one of said first and second portions of said air bag is folded laterally with Z-folds, said first and second portions of said air bag inflating laterally outward when said air bag is inflated.

7. A method as set forth in claim 1 comprising the further step of accordion folding a top portion of the air bag after rolling up said bottom edge of said air bag toward said top edge of said air bag.

8. A method of folding an air bag having a front part for facing an occupant of a vehicle when the air bag is inflated, a back part for facing away from the occupant when the air bag is inflated, and a side part sewn to the front and back parts and extending between the front and back parts, the air bag being connected to an air bag retainer, said method including the steps of:

arranging the air bag in a first configuration with the front and back parts overlying each other and with the side part folded and extending outwardly from the front and back parts, the air bag when in the first configuration having a top edge, a bottom edge, and first and second portions on opposite sides of a top to bottom centerline of the first configuration;

the air bag and the retainer each having a height measured in a direction along the centerline and a width measured in a direction perpendicular to the centerline;

manipulating the air bag from the first configuration to a second configuration in which the air bag overlies the retainer and has a height corresponding to the height of the retainer, the first and second portions of the air bag having portions that project laterally beyond respective opposite sides of the retainer, the side part of the air bag still being folded and extending outwardly from the front and back parts; and manipulating the air bag from the second configuration to a third configuration in which the laterally projecting portions of the air bag are moved laterally inward to overlie the retainer and the air bag has a width corresponding to the width of the retainer, said step of manipulating the air bag to the third configuration including folding the first and second portions of the air bag about the centerline.

9. A method as set forth in claim 8 wherein said step of manipulating the air bag from the first configuration to a second configuration includes manipulating the air bag between the bottom edge and the top edge.

10. A method as set forth in claim 9 wherein said step of manipulating the air bag between the bottom edge and the top edge includes manipulating the air bag from the bottom edge to the top edge.

11. A method as set forth in claim 8 wherein said step of manipulating the air bag from the second configuration to a third configuration includes forming a stack of folded air bag portions adjacent the retainer with the side part of the air bag being on top of the stack.

12. A method as set forth in claim 8 wherein said step of manipulating the air bag from the first configuration to the second configuration includes folding a top portion of the air bag onto the front part of the air bag to a position adjacent a top edge of the retainer and folding a bottom portion of the air bag onto the front part of the air bag to a position adjacent a bottom edge of the retainer.

13. A method of folding an air bag having a front part for facing an occupant of a vehicle when the air bag is inflated, a back part for facing away from the occupant when the air bag is inflated, and a side part sewn to the front and back parts and extending between the front and back parts, said method including the steps of:

arranging the air bag in a first configuration with the front and back parts overlying each other and with the side part folded and extending outwardly from the front and back parts, the air bag when in the first configuration having a top edge, a bottom edge, and first and second portions on opposite sides of a top to bottom centerline of the first configuration;

the air bag having a height measured in a direction along the centerline and a width measured in a direction perpendicular to the centerline;

manipulating the air bag from the first configuration to a second configuration in which the air bag has a height corresponding to the height of a final folded condition of the air bag, the first and second portions of the air bag having portions that project laterally, the side part of the air bag still being folded and extending outwardly from the front and back parts; and manipulating the air bag from the second configuration to a third configuration in which the laterally projecting portions of the air bag are moved laterally inward and the air bag has a width corresponding to the width of a final folded condition of the air bag, said step of manipulating the air bag to the third configuration including folding the first and second portions of the air bag about the centerline.

14. The method as set forth in claim 13 wherein said step of manipulating the air bag from the first configuration to a second configuration includes manipulating the air bag between the bottom edge and the top edge.

15. A method as set forth in claim 14 wherein said step of manipulating the air bag between the bottom edge and the top edge includes manipulating the air bag from the bottom edge to the top edge.

16. A method as set forth in claim 16 wherein said step of manipulating the air bag from the second configuration to a third configuration includes forming a stack of folded air bag portions having a width corresponding to the final folded condition of the air bag with the side part of the air bag being on top of the stack.

17. A method as set forth in claim 13 wherein said step of manipulating the air bag from the first configuration to the second configuration includes folding a top portion of the air bag onto the front part of the air bag and folding a bottom portion of the air bag onto the front part of the air bag.

18. A method as set forth in claim 13 wherein said step of manipulating the air bag from the first configuration to the second configuration includes folding a top portion of the air bag onto the back part of the air bag and folding a bottom portion of the air bag onto the back part of the air bag.

19. A method of folding an air bag having a front part for facing an occupant of a vehicle when the air bag is inflated, a back part for facing away from the occupant when the air bag is inflated, and a side part connected to the front and back parts and extending between the front and back parts when the air bag is inflated, the air bag being connected to an air bag retainer, said method including the steps of:

arranging the air bag in a first configuration with the front and back parts overlying each other and with the side part folded and extending outwardly from the front and back parts, the air bag when in the first configuration having a top edge, a bottom edge, and first and second portions on opposite sides of a top to bottom centerline of the first configuration;

the air bag and the retainer each having a height measured in a direction along the centerline and a width measured in a direction perpendicular to the centerline;

manipulating the air bag from the first configuration to a second configuration in which the air bag overlies the retainer and has a height corresponding to the height of the retainer, the first and second portions of the air bag having portions that project laterally beyond respective opposite sides of the retainer, the side part of the air bag still being folded and extending outwardly from the front and back parts; and manipulating the air bag from the second configuration to a third configuration in which the laterally projecting portions of the air bag are moved laterally inward to overlie the retainer and the air bag has a width corresponding to the width of the retainer, said step of manipulating the air bag to the third configuration including folding the first and second portions of the air bag about the centerline;

said step of manipulating the air bag from the first configuration to the second configuration includes folding a top portion of the air bag on the retainer and thereafter folding a bottom portion of the air bag on the top portion of the air bag.

20. A method as set forth in claim 19 wherein said step of manipulating the air bag from the first configuration to the second configuration includes folding a bottom portion of the air bag on the retainer and thereafter folding a top portion of the air bag on the bottom portion of the air bag.

21. A method as set forth in claim 19 wherein said step of manipulating the air bag from the first configuration to the second configuration includes folding a top portion of the air bag onto the back part of the air bag to a position adjacent a top edge of the retainer and folding a bottom portion of the air bag onto the back part of the air bag to a position adjacent a bottom edge of the retainer.

22. A method of folding an air bag having a front part for facing an occupant of a vehicle when the air bag is inflated, a back part for facing away from the occupant when the air bag is inflated, and a side part connected to the front and back parts and extending between the front and back parts when the air bag is inflated, said method including the steps of:

arranging the air bag in a first configuration with the front and back parts overlying each other and with the side part folded and extending outwardly from the front and back parts, the air bag when in the first configuration having a top edge, a bottom edge, and first and second portions on opposite sides of a top to bottom centerline of the first configuration;

the air bag having a height measured in a direction along the centerline and a width measured in a direction perpendicular to the centerline;

manipulating the air bag from the first configuration to a second configuration in which the air bag has a height corresponding to the height of a final folded condition of the air bag, the first and second portions of the air bag having portions that project laterally, the side part of the air bag still being folded and extending outwardly from the front and back parts; and manipulating the air bag from the second configuration to a third configuration in which the laterally projecting portions of the air bag are moved laterally inward and the air bag has a width corresponding to the width of a final folded condition of the air bag, said step of manipulating the air bag to the third configuration including folding the first and second portions of the air bag about the centerline;

said step of manipulating the air bag from the first configuration to the second configuration includes folding a top portion of the air bag and thereafter folding a bottom portion of the air bag on the top portion of the air bag.

23. A method of folding an air bag having a front part for facing an occupant of a vehicle when the air bag is inflated, a back part for facing away from the occupant when the air bag is inflated, and a side part connected to the front and back parts and extending between the front and back parts when the air bag is inflated, said method including the steps of:

arranging the air bag in a first configuration with the front and back parts overlying each other and with the side part folded and extending outwardly from the front and back parts, the air bag when in the first configuration having a top edge, a bottom edge, and first and second portions on opposite sides of a top to bottom centerline of the first configuration;

the air bag having a height measured in a direction along the centerline and a width measured in a direction perpendicular to the centerline;

manipulating the air bag from the first configuration to a second configuration in which the air bag has a height corresponding to the height of a final folded condition of the air bag, the first and second portions of the air bag having portions that project laterally, the side part of the air bag still being folded and extending outwardly from the front and back parts; and manipulating the air bag from the second configuration to a third configuration in which the laterally projecting portions of the air bag are moved laterally inward and the air bag has a width corresponding to the width of a final folded condition of the air bag, said step of manipulating the air bag to the third configuration including folding the first and second portions of the air bag about the centerline;

wherein said step of manipulating the air bag from the first configuration to the second configuration includes folding a bottom portion of the air bag and thereafter folding a top portion of the air bag on the bottom portion of the air bag.

24. A method of folding an air bag having a front part for facing an occupant of a vehicle when the air bag is inflated, a back part for facing away from the occupant when the air bag is inflated, and a side part connected to the front and back parts and extending between the front and back parts when the air bag is inflated, the air bag being connected to an air bag retainer, said method including the steps of:

arranging the air bag in a first configuration with the front and back parts overlying each other and with the side part folded and extending outwardly from the front and back parts, the air bag when in the first configuration having a top edge, a bottom edge, and first and second portions on opposite sides of a top to bottom centerline of the first configuration;

the air bag and the retainer each having a height measured in a direction along the centerline and a width measured in a direction perpendicular to the centerline;

manipulating the air bag from the first configuration to a second configuration in which the air bag overlies the retainer and has a height corresponding to the height of the retainer, the first and second portions of the air bag having portions that project laterally beyond respective opposite sides of the retainer, the side part of the air bag still being folded and extending outwardly from the front and back parts; and manipulating the air bag from the second configuration to a third configuration in which the laterally projecting portions of the air bag are moved laterally inward to overlie the retainer and the air bag has a width corresponding to the width of the retainer, said step of manipulating the air bag to the third configuration including folding the first and second projecting portions of the air bag about the centerline in a zig-zag pattern to form stacks of folds with the side part of the air bag being on top of the stacks, the stacks being a mirror image of each other about the centerline.

25. A method of folding an air bag having a front part for facing an occupant of a vehicle when the air bag is inflated, a back part for facing away from the occupant when the air bag is inflated, and a side part connected to the front and back parts and extending between the front and back parts when the air bag is inflated, said method including the steps of:

arranging the air bag in a first configuration with the front and back parts overlying each other and with the side part folded and extending outwardly from the front and back parts, the air bag when in the first configuration having a top edge, a bottom edge, and first and second portions on opposite sides of a top to bottom centerline of the first configuration;

the air bag having a height measured in a direction along the centerline and a width measured in a direction perpendicular to the centerline;

manipulating the air bag from the first configuration to a second configuration in which the air bag has a height corresponding to the height of a final folded condition of the air bag, the first and second portions of the air bag having portions that project laterally, the side part of the air bag still being folded and extending outwardly from the front and back parts; and manipulating the air bag from the second configuration to a third configuration in which the laterally projecting portions of the air bag are moved laterally inward and the air bag has a width corresponding to the width of a final folded condition of the air bag, said step of manipulating the air bag to the third configuration including folding each of the first and second portions of the air bag in a zig-zag pattern about the centerline to form stacks of folds with the side part of the air bag being on top of the stacks, the stacks being a mirror image of each other about the centerline.

* * * * *

UNITED STATES PATENT AND TRADEMARK OFFICE
CERTIFICATE OF CORRECTION

PATENT NO. : 6,739,622 B2
DATED : May 25, 2004
INVENTOR(S) : Rick L. Halford et al.

It is certified that error appears in the above-identified patent and that said Letters Patent is hereby corrected as shown below:

<u>Column 13,</u>
Line 54, after "claim," delete "16" and insert -- 13, --.

Signed and Sealed this

Sixteenth Day of November, 2004

JON W. DUDAS
*Director of the United States Patent and Trademark Office*